US012768790B2

(12) United States Patent
Rodríguez García et al.

(10) Patent No.: US 12,768,790 B2
(45) Date of Patent: Oct. 20, 2026

(54) MEASUREMENT CHAMBER EXTENSION FOR SPECTROPHOTOMETRIC CHARACTERIZATION OF A STERILE LIQUID IN A POLYMER CONTAINER BY NIR- OR RAMAN-SPECTROPHOTOMETRY

(71) Applicant: Ayna Analytics GmbH, Kleinmachnow (DE)

(72) Inventors: Laura Rodríguez García, Potsdam (DE); David Mainka, Potsdam (DE)

(73) Assignee: Ayna Analytics GmbH, Kleinmachnow (DE)

( * ) Notice: Subject to any disclaimer, the term of this patent is extended or adjusted under 35 U.S.C. 154(b) by 92 days.

(21) Appl. No.: 18/682,657

(22) PCT Filed: Jul. 9, 2021

(86) PCT No.: PCT/EP2021/069213
§ 371 (c)(1),
(2) Date: Feb. 9, 2024

(87) PCT Pub. No.: WO2023/280427
PCT Pub. Date: Jan. 12, 2023

(65) Prior Publication Data
US 2024/0210323 A1 Jun. 27, 2024

(51) Int. Cl.
*G01N 21/65* (2006.01)
*G01N 21/3577* (2014.01)
*G01N 21/359* (2014.01)

(52) U.S. Cl.
CPC ......... *G01N 21/65* (2013.01); *G01N 21/3577* (2013.01); *G01N 21/359* (2013.01); *G01N 2201/0636* (2013.01); *G01N 2201/08* (2013.01)

(58) Field of Classification Search
CPC .... G01N 21/65; G01N 21/94; G01N 21/3577; G01N 21/359; G01N 21/0303;
(Continued)

(56) References Cited

U.S. PATENT DOCUMENTS 5,859,703 A 1/1999 Aldridge et al.
10,145,784 B2 * 12/2018 Allgeyer ............. G01N 21/255
(Continued)

FOREIGN PATENT DOCUMENTS

AU 2016 206 289 8/2016
CN 105115902 A * 12/2015
(Continued)

OTHER PUBLICATIONS

International Search Report and Written Opinion dated Apr. 7, 2022 in PCT/EP2021/069213.

*Primary Examiner* — Kara E. Geisel
*Assistant Examiner* — Christina I Xing
(74) *Attorney, Agent, or Firm* — Dicke, Billig & Czaja, PLLC

(57) ABSTRACT

A measurement chamber extension for a spectrophotometric characterization with a NIR-spectrophotometer or a Raman-spectrophotometer of a liquid in a polymer container, wherein a measurement chamber extension comprises: an adapter plate having an adapter opening; a container holder, and an optical element, selected from a mirror and a wave-guide. The adapter is configured to cover in a light-tight manner the measurement chamber of the NIR-spectrophotometer or of the Raman-spectrophotometer. The container holder is configured to allow a close placement of the optical element adjacent to the polymer container containing the liquid providing a loss-free transmission or transflection of
(Continued)

the measurement light beam from the optical element to a detector of the NIR-spectrophotometer or Raman-spectrophotometer.

17 Claims, 9 Drawing Sheets

(58) Field of Classification Search
CPC ..... G01N 2201/0636; G01N 2021/651; G01N 2201/0245; G01N 2201/064; G01N 2201/08; G01N 15/075; G01N 15/0205; G01N 15/06; G01N 2015/0092; G01N 2015/0687
See application file for complete search history.

(56) References Cited

U.S. PATENT DOCUMENTS

| | | | | |
|---|---|---|---|---|
| 2010/0309468 | A1* | 12/2010 | Flank | G01N 21/359 356/326 |
| 2011/0021890 | A1* | 1/2011 | Nishizawa | A61B 5/150389 600/310 |
| 2018/0163995 | A1* | 6/2018 | Ren | F24S 70/30 |

FOREIGN PATENT DOCUMENTS

| | | | |
|---|---|---|---|
| JP | 2006098276 | 4/2006 | |
| JP | 2008002849 | 1/2008 | |
| JP | 2025087961 | 6/2025 | |
| WO | WO-2020074918 A1 * | 4/2020 | G01N 21/0303 |
| WO | 2026/047486 | 3/2026 | |

* cited by examiner

Section BB'

Section AA'

MEASUREMENT CHAMBER EXTENSION FOR SPECTROPHOTOMETRIC CHARACTERIZATION OF A STERILE LIQUID IN A POLYMER CONTAINER BY NIR- OR RAMAN-SPECTROPHOTOMETRY

CROSS-REFERENCE TO RELATED APPLICATIONS

This Utility Patent Application claims priority under 35 U.S.C. § 371 to International Application Serial No. PCT/EP2021/069213, filed Jul. 9, 2021, which is incorporated herein by reference in their entirety.

FIELD AND BACKGROUND

The present invention relates to the identification and/or quantification of an active pharmaceutical ingredient (API), an excipient and a possible adulterant and/or contaminant thereof, as well as the quantification/detection/verification of physical properties (agglomeration, particle size etc.) of such medicinal product in liquid state in a sterile package, particularly in an infusion bag or in a syringe within a sterile package.

Incorrect production or incorrect storage of pharmaceutical products can result in a loss of the intended effect, or may even harm the organism to which the pharmaceutical products are applied.

Therefore, quality and/or identity control of pharmaceutical products immediately before their application is of utmost importance. Such quality and/or identity control can, for example, be done by evaluating spectroscopic measurements of the pharmaceutical product which is often present as a sterile solution in a polymer container, e.g. an infusion bag or a disposable syringe which is held inside a sterile package.

Typically, a sample of a batch of the pharmaceutical product is taken and analysed resulting in the destruction of the sample/batch. As the batch number regarding individually produced infusion bags, pumps or syringes is often n=1, it is not possible to assess the quality of the compounding before the batch release. Moreover, those approaches often require an analytical laboratory as well as trained, highly specialized personnel to evaluate analysis results, e. g. spectra or chromatograms.

BRIEF SUMMARY

In order to not compromise the integrity and thus sterility of the original solution and its container, a measurement chamber extension according to claim 1 and a method according to claim 15 are suggested.

Particularly, by measuring a transmission or a transflection of a measuring light beam (sample beam) of a NIR-spectrophotometer or a Raman-spectrophotometer which is directed through the polymer container comprising the pharmaceutically active substance in dissolved state or as a suspension or an emulsion, whether in an infusion bag or in a syringe within a sterile package and, optionally, backwards—by measuring in transflection—the gathered information can be used to identify or even quantify chemical components in the liquid.

Thus, the used measurement principles can be based upon transflection (light path through the package and backwards) or transmission (sample beam passes only once through the package (liquid)).

Based on the individual shape and size of the containers (primary and/or secondary) and the relationship between these containers and the product itself (including its properties regarding material, transparency, printing and of course the individual spatial behavior, especially regarding pumps or infusion bags with a flexible container wall) the best area for measurements is defined. The optimal parameters for this area are as follows:

1. The light can pass through the containers minimizing the loss of light intensity with individual holders (e. g. holders comprising a diffusive mirror or a waveguide);
2. The distance between the different containers and the product is minimized, so that the shortest possible way for the light is used (e. g. secondary packaging plastic bag/tray);
3. A minimal influence on the spectrum by the containers themselves (e. g. different materials, layers, transparency, layer thickness) is ensured;
4. The light beam is focused on the liquid, i.e. into the cylinder of the syringe within the package (container);
5. The liquid product is typically presented with a reproducible layer thickness corresponding to the diameter of the syringe cylinder which allows robust and repeatable measurements.
6. The liquid product is typically presented with a reproducible layer thickness corresponding to the distance between the measurement window and the mirror and the mirror fixing member (if reflectance-mode is used), or the measurement window and the liquid layer formed by the bag orienting member and the outer contour (if transmission-mode is used).

The NIR or Raman instrument, the (optional) sterile package of the sample, as well as the optical element are positioned such as to ensure one or more of the above-mentioned conditions.

For positioning of, e.g., a syringe or an infusion bag to be measured, different types of holders or combinations of these can be used. E. g. plastic and/or metallic holders containing electronical devices for identity recognition of each part and automatic ensuring of the correct positioning of the parts via a software solution. These holders are individually manufactured depending on the particular type of syringe and thus the required optimal position of the corresponding package holder. As infusion bags are typically standardized, a holder for infusion bags for each product line of each producer is typically easier to design and hence, rather universal.

As to the product lines of different manufacturers we observed, that a given manufacturer uses typically polymer materials of identical or nearly identical composition even for different pharmaceutical compounds (API). Therefore, simply by comparing measurement data (e.g. spectra or their derivatives) of different products (infusion bags containing the liquid, the suspension or the semi-solid—each comprising an API of interest whose quality needs to be monitored) an identity of a product or its possible contamination can be reliably determined, even without knowledge of the spectral data of the polymer package, as the signals generated by the polymer package (wall of the infusion bag, syringe cylinder, cartridge cylinder) are always the same. Thus, surprisingly, a simple and reliable method for observing erroneous misfiling as well as a contamination or illicit substitution of a pharmaceutical solution by an adulterant in pre-filled polymer packages is provided. The suggested method advantageously does not compromise the sterility of the measured pre-filled syringes, pumps, cartridges etc.

Thus, the invention describes the identification, the quantification and discrimination of using NIR-spectral and Raman-spectral characteristics of package material (plastic bag or syringe and syringe packaging), solvent and pharmaceutically active ingredient as well as unwanted solutes (adulterants and/or contaminants).

Advantageously, an erroneous misfiling as well as a contamination or illicit substitution of a pharmaceutical solution by an adulterant can be identified. Even a correct concentration of a given substance within the bag or syringe can be detected.

Figure 1:
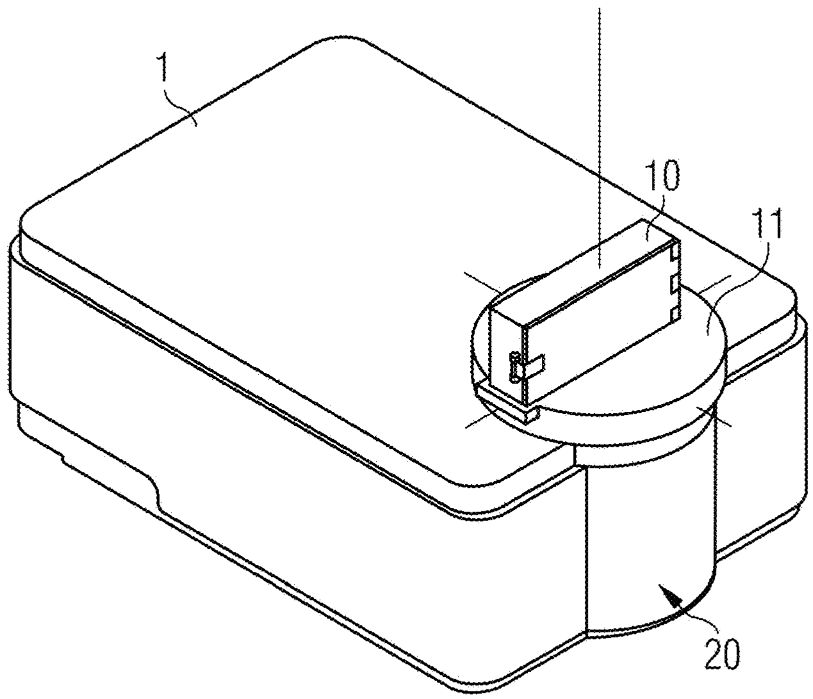
FIG. 1 shows an embodiment of the suggested measurement chamber extension 10 connected to a commercially available NIR-spectrophotometer 1 or Raman-spectrophotometer 1.

A full and enabling disclosure of the present invention, including the best mode thereof, to one of ordinary skill in the art, is set forth more particularly in the remainder of the description, including reference to the accompanying figures.

In the following detailed description, reference is made to the accompanying figures, which form a part hereof, and in which are shown by way of illustration specific embodiments and features of the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

DETAILED DESCRIPTION

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

As used in this specification (above and below) and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "a semi-solid" as used herein, comprises a gel, a paste or a lotion (of higher viscosity in comparison to usual physiological (aqueous) solutions and therefore mostly a two-phased-system, solid/liquid or liquid/liquid). The term is used in correspondence to its common understanding by the skilled person in pharmaceutical technology and/or food technology.

Further it is noted, that the term "solution" as used therein, is not restricted to aqueous solutions, but relates also to other solvents, e.g. oils. Hence, liquid compositions which can be measured using the suggested measurement chamber extension may comprise solutions and dispersions, for example, consist of a multicomponent/multiphase system.

According to an embodiment a measurement chamber extension for a NIR-spectrophotometer or for a Raman-spectrophotometer is suggested. It is adapted for the corresponding spectrophotometric characterization of a sterile liquid in a polymer container, e.g. an infusion bag or a disposable syringe which is enwrapped in a sterile package. The measurement chamber extension comprises:

- an adapter having an adapter opening;
- a container holder; and
- an optical element selected from a mirror and a waveguide;
- wherein the adapter is configured to cover in a light-tight manner the measurement chamber of the NIR-spectrophotometer or Raman-spectrophotometer and the adapter opening is arranged to encompass a measurement window of the selected spectrophotometer to provide exposition of the liquid to a measurement light beam emitted from the measurement chamber of the spectrophotometer through the measurement window;
- wherein the container holder is configured to allow a placement of the optical element adjacent to the polymer container containing the liquid providing a loss-free transmission or transflection of the measurement light beam from the optical element, optionally back through the measurement window, to a detector of the selected spectrophotometer; and
- wherein the container holder comprises a clamp which is configured to hold a tubular section of the polymer container as to allow a reproducible measurement condition.

Advantageously, the comparison of the collected new NIR-spectrum with known and alternatively analyzed NIR-spectra of the same sample type (packaging, excipient, API), allow qualitative and at least semiquantitative detection of chemical substances and/or physical properties of the sample dissolved or suspended in the liquid inside the container. Thus, erroneous compositions or substandard quality of the liquid or its contamination by unwanted substances can be identified.

According to an embodiment the container holder comprises a support structure for the optical element, wherein the support structure comprises a channel, wherein a width of the channel is adapted to fit with a width of the measurement window of the corresponding spectrophotometer (NIR- or Raman-spectrophotometer).

Advantageously that allows passage of the sample beam across the package, the syringe, and the package for recording a NIR-spectrum of e. g. transflected light without loss of intensity (especially regarding transflection).

According to an embodiment the optical element comprises a mirror comprising a gold layer or at least an optical fiber or a waveguide.

Advantageously, gold reflects more than 95 percent of incident radiation at wavelengths above 700 nm. Therefore, the channel and the mirror can be coated with a gold layer or another reflective coating. Accordingly, the light measured is a transflected light. Said gold layer can be deposited by vacuum deposition or by plating, both galvanic and electroless; as well as by other suitable additive manufacturing techniques. Optical waveguides or fibers advantageously may be selected to provide a loss-free guiding, at least over the short distances which are relevant here (typically ten or a few tens of cm) for coupling from the polymer package to a photodetector or into the measuring chamber of the corresponding spectrophotometer (NIR- or Raman-spectrophotometer).

According to an embodiment the container holder comprises a receptacle formed by the channel together with the mirror.

Advantageously, such holder is adapted to hold the container reproducibly.

According to an embodiment the surface of the channel is covered with a gold layer as well.

Advantageously, the signal/noise ratio can be improved. The mirror can be made, e.g., of gold, spectralon (PTFE), or aluminum—which may provide highly reflective surfaces for light of relevant wavelength ranges (both for NIR- and Raman-spectrophotometry).

According to an embodiment the container holder is encased by a light-tight box which comprises a lid which is adapted to close the light-tight box in a light-tight manner.

Again, the signal/noise ratio is improved and thus accuracy of measurement enhanced. An even more compact design is achieved. The light guide may comprise a hollow channel or a waveguide or a bundle of waveguides. For instance, the light guide may comprise a lateral recess and the mirror may be placed at the distant side of the light guide, relative to the entry of the sample beam (i.e. relative to the opening, where the light guide is fitted into the box). The opening may even be arranged in the lid of the box.

According to an embodiment the optical element is fixed to the lid. According to an embodiment the optical element might be arranged such on the lid as to hold the circular part of the polymer container close to the channel opening.

For instance, the optical element may be connected to the lid by an elastic element, e.g. a spring or a spongeous material. Advantageously, by closing the lid the optical element is pressed against the polymer container, e.g. a syringe in the package. This may be used to simplify the design of the measurement chamber extension and to optimize the measurement process.

According to an embodiment the gold layer on the surface of the channel merges with the gold layer of the mirror and the mirror is integrated with the channel.

The mirror together with the light guide may thus form a receptacle, i.e. the package holder. Advantageously, an orientation of the optical element, e.g. a mirror, to the light guide remains constant during all measurements which allows establishing standardized and reproducible measurement conditions.

According to an embodiment the optical element is a mirror, particularly, a diffusive mirror.

Advantageously that allows collecting with the light guide and analyzing with the NIR-spectrophotometer or Raman-spectrophotometer a representative signal comprising transflected through the liquid within the syringe light.

According to an embodiment the gold layer of the diffusive mirror encompasses multiple mirrors, each mirror comprising a flat polygonal face, wherein the multiple mirrors are arranged as a corrugated surface of the mirror.

Advantageously, gold reflects more than 95 percent of incident radiation at wavelengths above 700 nm. The corrugated structure allows complete collection even of stray light deflected within the container. Advantageously, even finely dispersed (suspended) particles may be measured.

According to an embodiment the multiple mirrors of the rough or smooth mirror surface can be arranged to comprise an optimized mirror or just a single smooth or rough mirror. The surface of these is at least partially covered by the gold layer.

Advantageously, the indicated shapes, i.e. the 3-dimensional structure of the rough surface allows for nearly complete diffuse reflection of the incident light, i.e. of the sample beam after its passage(s) through the package, the syringe walls and the liquid.

According to an embodiment the rough mirror surface comprises a roughness in a range of 20 μm-1000 μm.

Advantageously, a roughness in the range of 20 μm-1000 μm allows for complete diffusive reflection without signal loss and thus allows for high signal/noise ratios.

According to an embodiment the optical element is not a mirror but a waveguide.

Advantageously, waveguides typically allow for a loss-free guiding of light to and from the liquid layer within the polymer container.

According to an embodiment on the measurement window of the spectrophotometer a first waveguide is positioned as to guide the measuring light from a light source of the spectrophotometer to the liquid within the polymer container and the optical element, i.e. a second waveguide. The second waveguide is configured to guide the measuring light after it passed through the layer of the liquid in the polymer container, the layer having a defined thickness, from the polymer container to a photodetector of the spectrophotometer.

Advantageously, the design of the measurement chamber extension can be greatly simplified: The polymer container which contains the liquid with the active pharmaceutical ingredient (whether a solution of the pharmaceutically active substance or a suspension/emulsion thereof) needs merely to be insulated light-tightly, e.g. be put in a light-tight box, and the two end surfaces of the first waveguide and the second waveguide (i.e. the optical element) need to be adjusted with respect to each other as to accommodate in a gap formed between the two ends a layer (having a defined thickness) of the liquid, comprising the two polymer walls of the polymer container surrounding the polymer container and the liquid itself.

According to an embodiment the polymer container is a disposable syringe.

Currently, many drugs are sold in prefilled disposable syringes, their quality can be controlled. Typically, disposable syringes are made of certain well characterized polymer materials (due to the fact, that the primary and secondary packaging are thoroughly defined and only qualified suppliers can be used by the pharmaceutical manufacturer), therefore, analysis of measurement data can be simplified.

According to an embodiment the light guide comprises a channel, e.g. a tube flange, wherein an end of the channel (tube flange) is shaped into a tongue which forms a receptacle, i.e. an abutment, for fitting and holding a cylinder of the syringe in an orthogonal orientation relative to a central axis of the tube flange, wherein a surface of the tongue which is oriented towards the tube flange comprises a corrugated surface comprising the mirror, and the cylinder of the syringe is arrangeable in the receptacle within a light path of the sample beam.

Advantageously, the flange pipe (tube flange) encloses a light-guiding channel, which is also coated with a reflecting layer, e.g. a gold layer. The light-guiding channel ends at the corrugated mirror surface and is thus adapted to allow passage of the sample beam towards the syringe and the liquid contained therein up to the diffusive mirror, and afterwards to guide the diffusively reflected (transflected) light from the diffusive mirror to the detection unit of the NIR-spectrophotometer or Raman-spectrophotometer or through a second light-guiding channel to a transmission detector.

According to an embodiment the disposable syringe is enclosed by, i.e. enwrapped in, a sterile package.

Such sterile packages typically consist of polymer foils. Their materials are known and specified by the manufacturer. Therefore, corresponding measurements can be verified using an appropriately adapted database.

According to an embodiment the adapter opening is adapted to accommodate a corner of an infusion bag.

Figure 9:
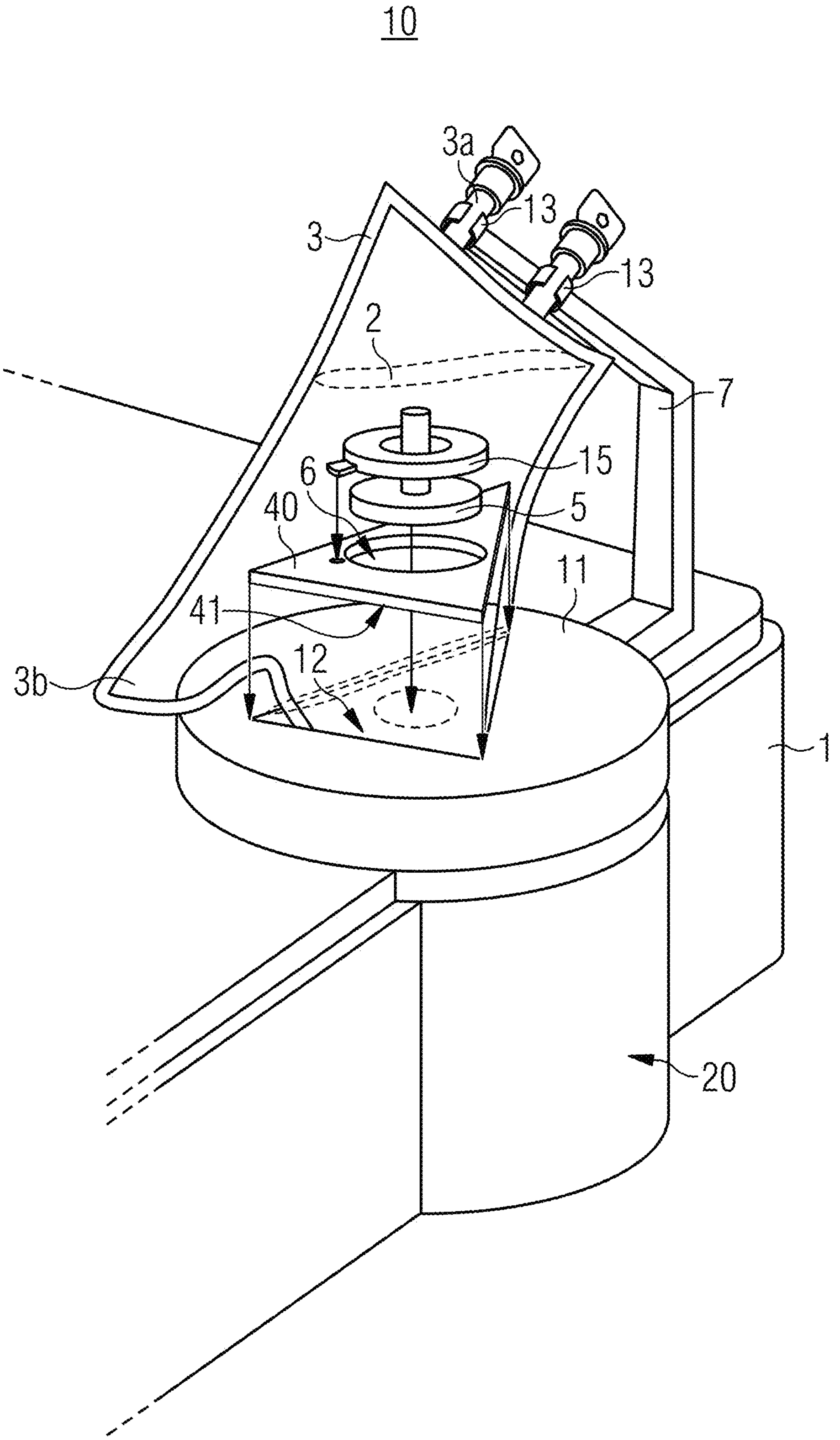
FIG. 9 shows an embodiment of a measurement chamber extension configured for measurements at infusion bags.

As evident from FIG. 9, element 40, the adapter comprises a hole (channel) which may also be covered by a mirror surface or may lead in a light-guiding channel to a transmission detector. The adapter form can be triangular, but is always adapted individually to the shape of the infusion bag or pump of interest (comprising other forms as well). As indicated, materials of the mirror surface may comprise, e.g., aluminum, spectralon (sintered PTFE), or gold. Advantageously, the corner of the infusion bag can be compressed (squeezed) until merely a thin layer of liquid remains. Furthermore, liquid can be completely squeezed out from this corner, in order to obtain a spectrum of the bag's polymer material alone. Thus, identification or quantification of signals which belong to the pure substance (plus solvent, excipient etc.) is facilitated.

According to an embodiment the mentioned before measurement chamber extension comprises an adapter with an opening which is configured for measurements of a liquid in an infusion bag which further comprises a bag orienting member, wherein an outer contour of the bag orienting member is configured to fit over a major part of an outer contour length with an inner contour of the adapter opening, if the bag orienting member is at least partially inserted into the adapter opening. The bag orienting member can comprise clamps to ensure an optimal, reproducible pathway. Either two separate parts above and beneath the liquid container to guide the light or one clamp comprising these both parts are possible.

Advantageously, the outermost rim of the corner can be protected from ambient light, as it fits into the space formed by the opening in the adapter and the bag orienting member. The shorter part of the outer contour does fit with the inner contour of the opening in the base plate but allows the remainder of the bag to be held afar from the measurement path.

According to an embodiment corresponding pairs of permanent magnets are arranged at or near to fitting edges of the adapter opening and the bag orienting member.

Advantageously, e. g. small Niobium magnets may be inserted in adjacent sections to allow self-fitting of the bag orienting member with the adapter opening. These magnets can be inserted flush with an outer surface such as to even allow light-tight fitting.

According to an embodiment a thickness of a layer of the liquid or of a (nano-) particle suspension in the polymer container, e. g. a bag or a syringe is adjustable between 0.2 mm through 5.1 mm, preferably the layer thickness is adjustable between 0.5 mm through 2.1 mm.

Advantageously, optimal and reproducible layer thickness for transflection or transmission measurements can be achieved.

According to an embodiment a position of the optical element can be stabilized by a fixing (or holding) member. A stabilization of a horizontal plane as well as a vertical stabilization and hence, a defined layer thickness can be reached.

Advantageously, measurement conditions can thus be standardized.

According to an embodiment the holding or fixing member and the bag orienting member each comprise at least one magnet of a pair of permanent magnets for stabilization of the optical element at or within the channel, wherein the channel is dimensioned to encompass, i.e. to tightly fit, outer dimensions and shape of the optical element, e.g. a circular mirror.

Advantageously, reproducibility of the measurements can be further improved.

According to an embodiment a method for analyzing by NIR-spectroscopy a liquid or a semi-solid in a polymer container is suggested. The polymer container is selected from an infusion bag and a syringe. The syringe or the infusion bag or pump may optionally be enclosed in a sterile package. Thus, a pharmaceutically or otherwise biologically active substance or a substance used as an excipient which is dissolved or suspended (dispersed) in the liquid can be measured without extra sampling, i. e. without unwrapping or opening the polymer container, i. e. preserving the sterility of the original liquid. The method is based on the use of the measurement chamber extension described above, wherein the method comprises the steps:

- holding a circular part of the polymer container by a receptacle;
- arranging the optical element adjacent to a surface of the polymer container;
- directing a measurement light beam towards the optical element and analyzing a transmitted or a transflected light with the NIR-spectrophotometer or with the Raman-spectrophotometer;
- comparing a signal generated by the transmitted or the transflected light with a data set stored in a data base comprising NIR-spectra or Raman-spectra of similar or identical samples; and
- determining an identity of a solute dissolved in the liquid and/or detecting an adulterant or contaminant in the liquid and/or detecting, at least semi-quantitatively, a concentration of the pharmaceutically active substance or a contaminant thereof, and/or—determining a physical property (e.g. a particle size, a particle agglomeration) of a solute dissolved in the liquid or of particles dispersed per liquid volume and/or detecting an adulterant or contaminant in the liquid or in the dispersion, respectively.

Advantageously, said method allows to determine qualitatively and at least semi-quantitatively a physical or chemical parameter of the liquid or semi-solid contained in the polymer container (infusion bag or disposable syringe) and any relevant contaminant or erroneously contained foreign substance (e.g. adulterant, product of decomposition of the intended substance or the like). Further, if the liquid comprises a dispersion of suspended (nano-) particles, the homogeneity of the dispersion can be evaluated. In addition, a quantitative determination of the active pharmaceutical ingredients, a verification of the pharmaceutical quality of the product in the polymer container can be made; as well as its physical properties (e. g. particle size, presence of agglomerations, etc.) can be obtained.

According to an embodiment the sample beam comprises light within a wavenumber range of 4,000 $cm^{-1}$-12,500 $cm^{-1}$.

Advantageously, the spectral properties in the indicated wavelength range can be used to differentiate various pharmaceutical substances (incl. API and excipient), relevant contaminants, and physical properties (e. g. particle size, agglomeration . . . ).

According to an embodiment the suggested method comprises repetitive measurements by different sample beams having different wavelengths. These sample beams are directed towards the reflective mirror under identical angles but can also be directed under different angles towards the reflective mirror. For instance, different incident angles can be selected for an identical wavelength. Different wavelengths can advantageously be directed (transflected) by the diffusive mirror under different incident angles.

Advantageously, a precision of the measurements can be enhanced.

According to an embodiment the database used for analyzing obtained spectra comprises datasets belonging to the different sample types including typical product ranges (see also Ph. Eur. 2.2.40). Typically, these materials comprise organic polymers, such as e. g. PE, PP, PVC, PMMA. Further, a software of the used spectrophotometer or a similar software is adapted to extract from a currently measured NIR-spectrum the information of interest (e. g. absorbance at certain wavelengths linking to a e. g. API content).

Advantageously, that allows extracting the information of interest out of the spectral data which can be used to undoubtedly identify or quantify the substance dissolved or suspended in the liquid or to quantify a physical parameter of the composition which is contained in the syringe.

According to an embodiment software stored in the NIR-spectrophotometer or in the Raman-spectrophotometer or in the computerized system used to control the respective spectrophotometer, respectively, is adapted to extract from a measured NIR- or Raman-spectrum the corresponding spectrum belonging to the material comprising the polymer container or the sterile package of the syringe.

Advantageously spectral data belonging to the parameter of interest can be extracted and reliably be evaluated.

Each embodiment described above may be combined with any other embodiment or embodiments unless clearly indicated to the contrary.

As to the illustrations, the drawing in FIG. 1 represents merely one embodiment which is adapted, e.g. for use with a commercially available spectrophotometer (e.g. a NIR- or a Raman-spectrophotometer) as offered, e.g., by Bruker or Jasco, PerkinElmer, Shimadzu, Metrohm or Varian—to name a few. The measurement chamber extension 10 is connected to the NIR-spectrophotometer 1 or Raman-spectrophotometer 1 using an adapter 11 which fits to the opening of the measurement chamber 20.

Figure 2:
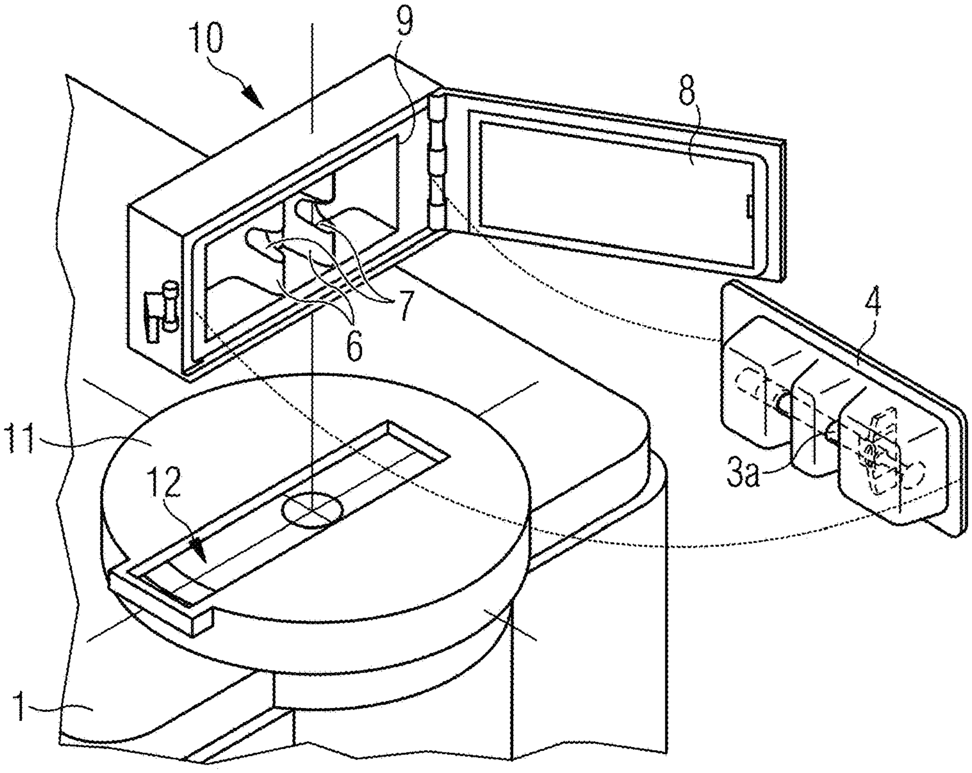
FIG. 2 shows schematically an exploded view of the suggested measurement chamber extension 10 in its relation to the NIR-spectrophotometer 1 or Raman-spectrophotometer 1.

FIG. 2 illustrates that the measurement chamber extension 10 comprises the light-tight box 9 with the open lid 8 ready for receiving a sterile package 4 containing a syringe 3' and holding it in the inner package holder 6 before connecting the measurement chamber extension 10 to the measurement chamber 20 of the NIR-spectrophotometer or Raman-spectrophotometer 1. It is shown that the light-tight box 9 is arranged just above the measurement chamber 20 to allow the measuring (sample) beam of the NIR-spectrophotometer 1 or Raman-spectrophotometer 1 (along the vertical line) to enter the light-guide 6, there shown as a light guiding channel 6 of the package holder 7.

Figure 3:
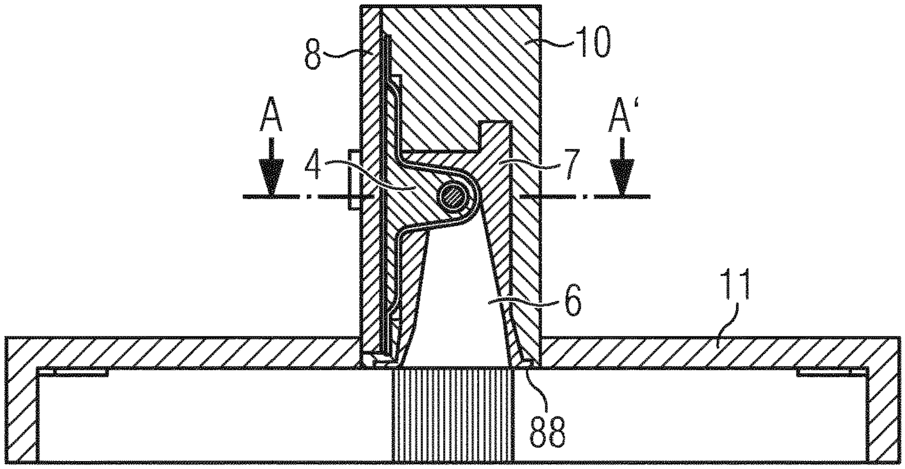
FIG. 3 shows a vertical cross-section (B-B' in FIG. 4) of a measurement chamber extension 10 fitted to a suitable spectrophotometer.

In FIG. 3 it is illustrated how the sterile package 4 comprising the syringe is held by the internal package holder 6 just at the center of the sample beam (red) of the light-tightly connected (via adapter 11) NIR-spectrophotometer 1 or Raman-spectrophotometer 1 (not shown).

Figure 4:
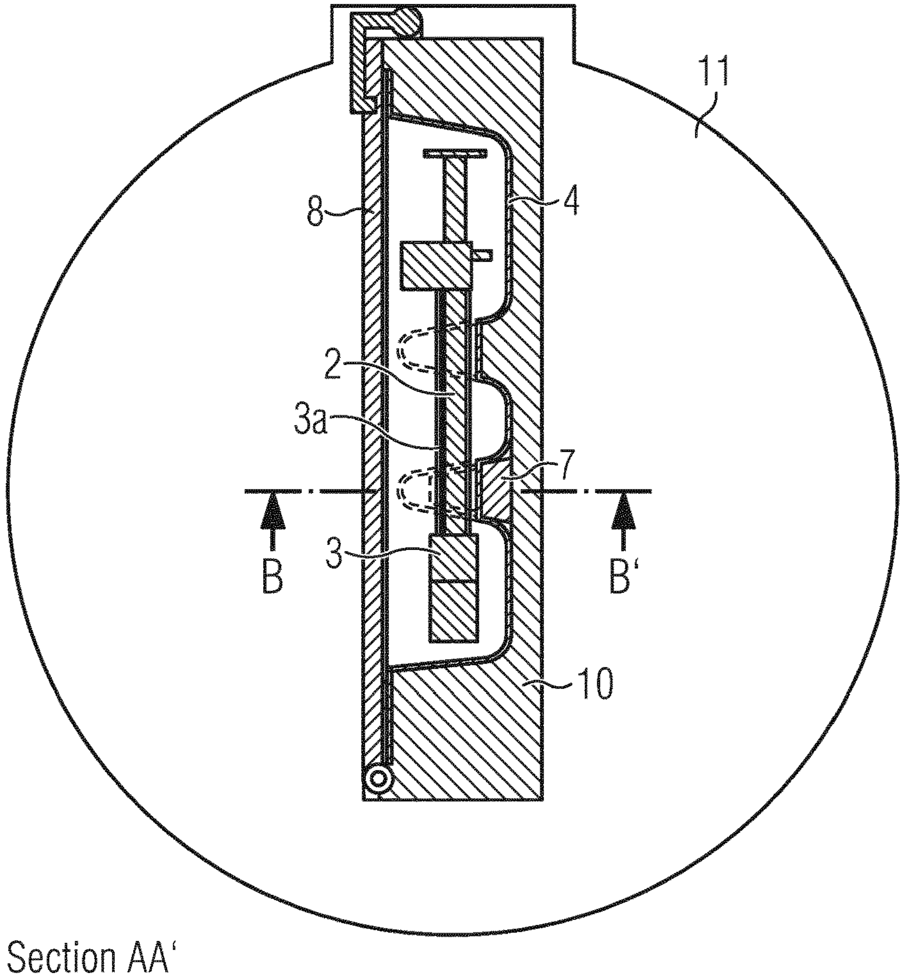
FIG. 4 shows a horizontal cross-section (A-A' in FIG. 3) at the level of the syringe 3' within the sterile package 4.

As can be seen in FIG. 4, the box 9 of the depicted embodiment must be closed by the lid 8 in order to allow light-tight fitting of the measurement chamber extension 10 with the NIR-spectrophotometer 1 or Raman-spectrophotometer 1.

Figure 5:
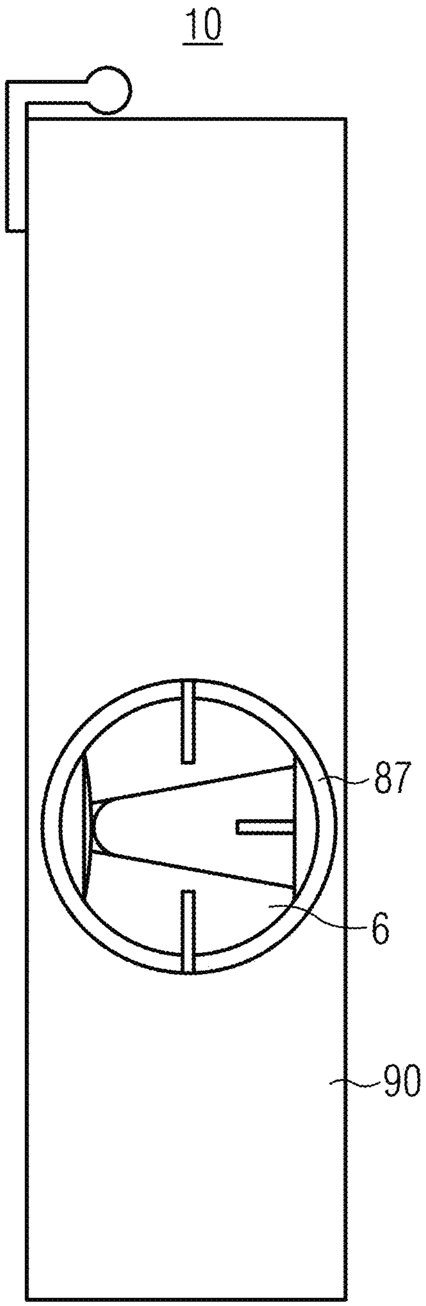
FIG. 5 is a view of the bottom of the suggested measurement chamber extension, i.e. of the outer fitting surface 90. It shows the measurement chamber extension in a view from the spectrophotometer.

FIG. 5 is a view on the measurement chamber extension 10 from beneath, i.e. from the side of the spectrophotometer. Shown is the wall of the box 9 with the circular opening 88 for receiving the light-guide 6. Four slits in a circular recess 86 ensure correct position of the light-guide 6 inside the light-tight box 9 and thus, the correct orientation of the light-guide 6. Advantageously, the shape and size of the light-guide 6 can be adapted for different enclosures (packages 4) of different syringes 3.

Figure 6:
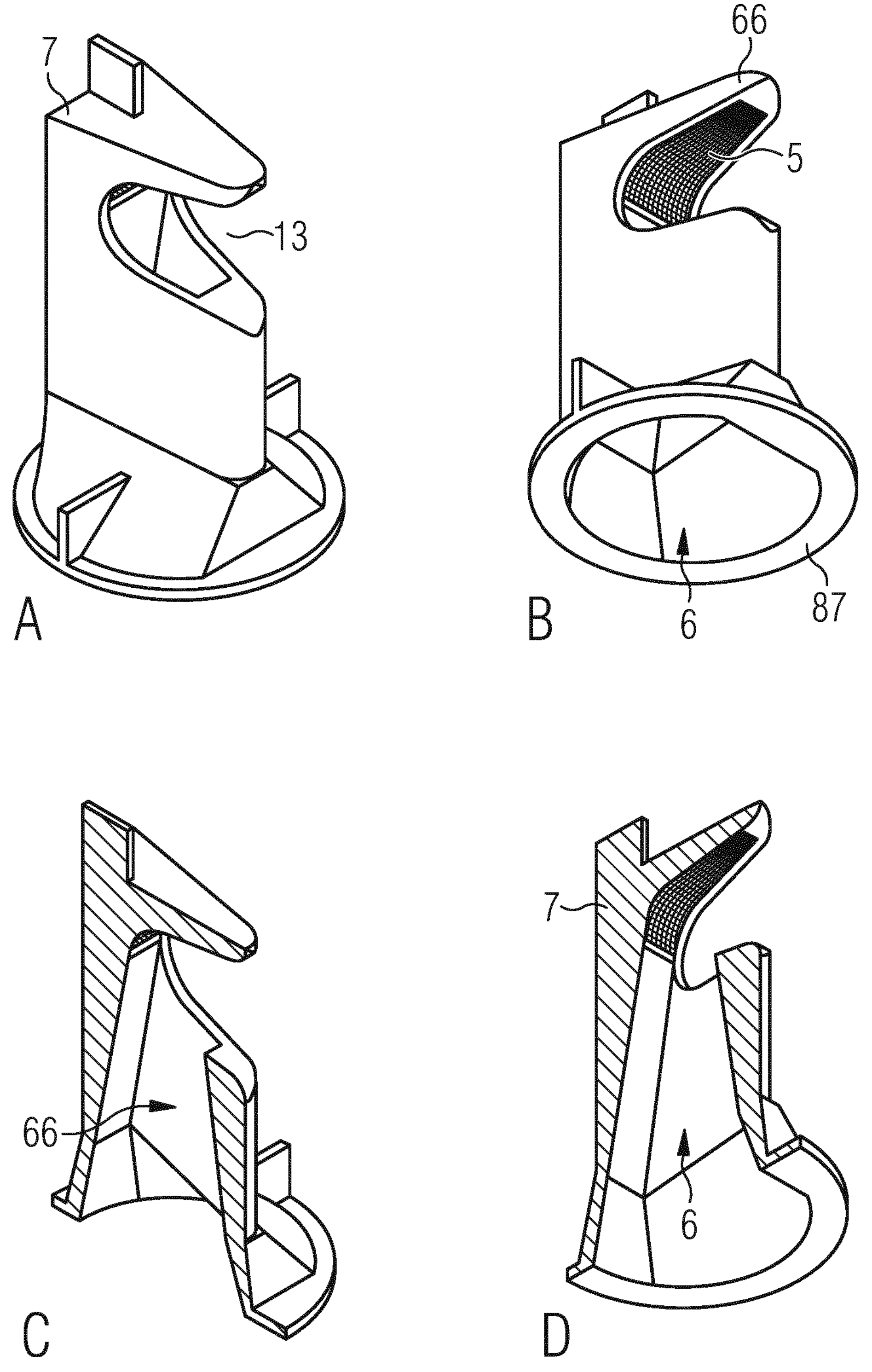
FIG. 6 shows different views of a container holder 7 comprising the light guiding channel 6 to be inserted into the opening 88 in the outer fitting surface 90 of the light-tight box 9.

Of the different views of a light-guide 6 which is there a combination of light-guide with the mirror 5 which together comprise a package holder 7. FIG. 6A shows the outside of said package holder 7 comprising the light guide 6 with a view into the light guide—here a channel 6. FIG. 6B shows a view into the light guide 6 with the mirror 5, here a diffuse mirror 5. The diffuse mirror 5 comprises a corrugated and rough mirroring surface. The tongue 66 of the light-guide 7 is adapted to hold a tubular part 3*a* of the sterile container 3, e.g. a syringe 3 in a sterile package 4. As indicated, the inner surface 66 of the light guide 6 is covered with a gold layer which merges with the gold layer of the corrugated mirror 5 inside the light guide 6. As illustrated also by the vertical cross-sections shown in FIGS. 6C and 6D the combined light-guide 6/package holder 7 comprises a mouth-shaped receptacle 13 or holder 13 comprising a tongue-like abutment 66. In the depicted embodiment the inner side of the abutment 66 which is directed towards the spectrophotometer 1 comprises the corrugated mirroring surface 5. Advantageously, the corrugated structure of the mirroring surface 5 allows both diffusive reflection and secure grip of the syringe 3 which is enwrapped in the sterile package 4.

Figure 7:
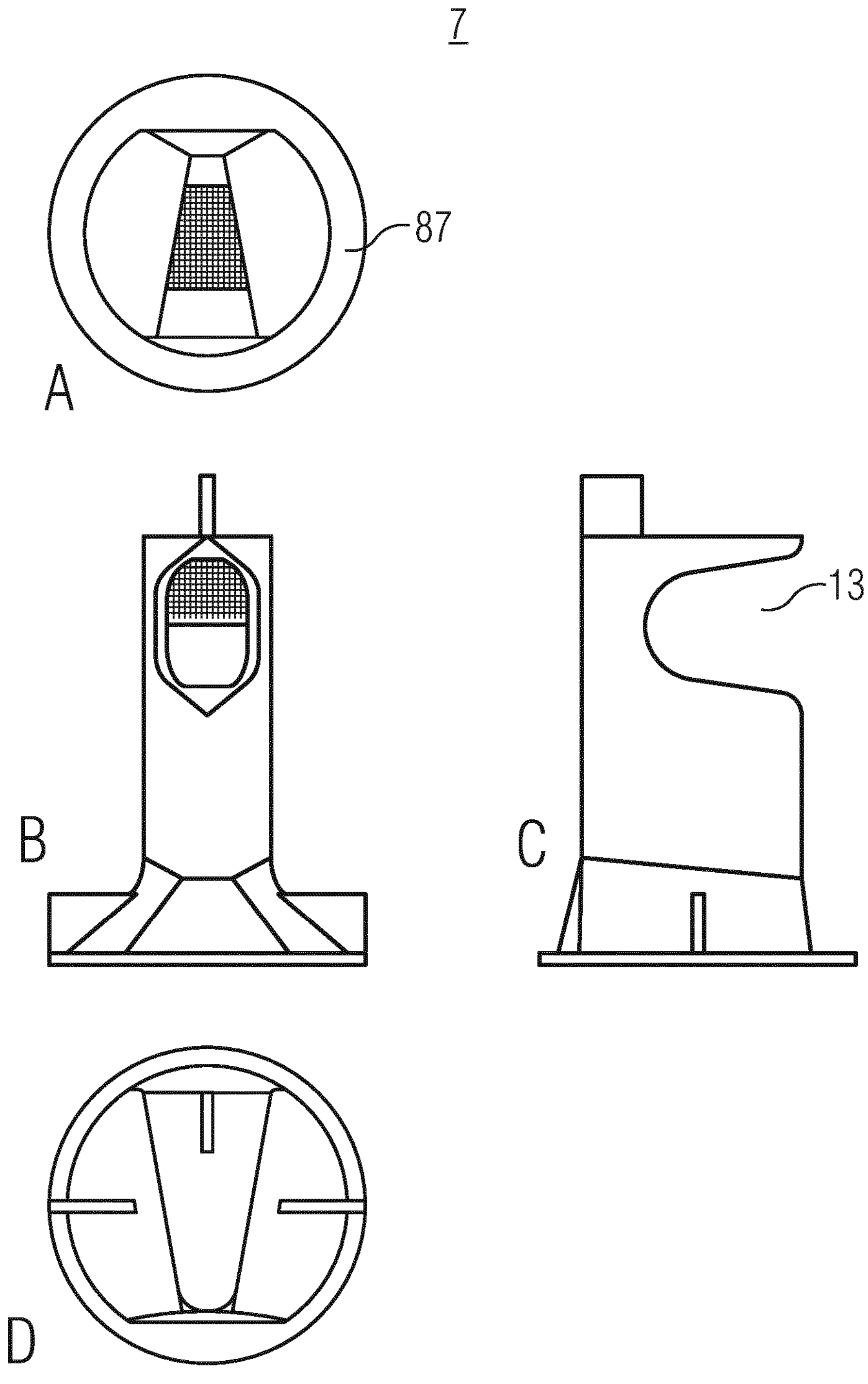
FIG. 7 shows different views of the container holder 7.

FIG. 7 shows a view from beneath of the inner syringe holder directly into the light-guide and on the (corrugated) mirror (A), a front view (B), a side view (C) and a view from atop (D) on the light-guide 6. According to an embodiment the light-guide 6 comprising the corrugated surface on the inner side of the tongue 66, i.e. the package holder, can be fabricated by injection molding, e.g. with polystyrene. It can also be fabricated from glass or, e.g., aluminum. Its surface can be coated with a gold layer, e.g. by electroless (barrel) plating or, e.g., by vapor deposition.

Figure 8:
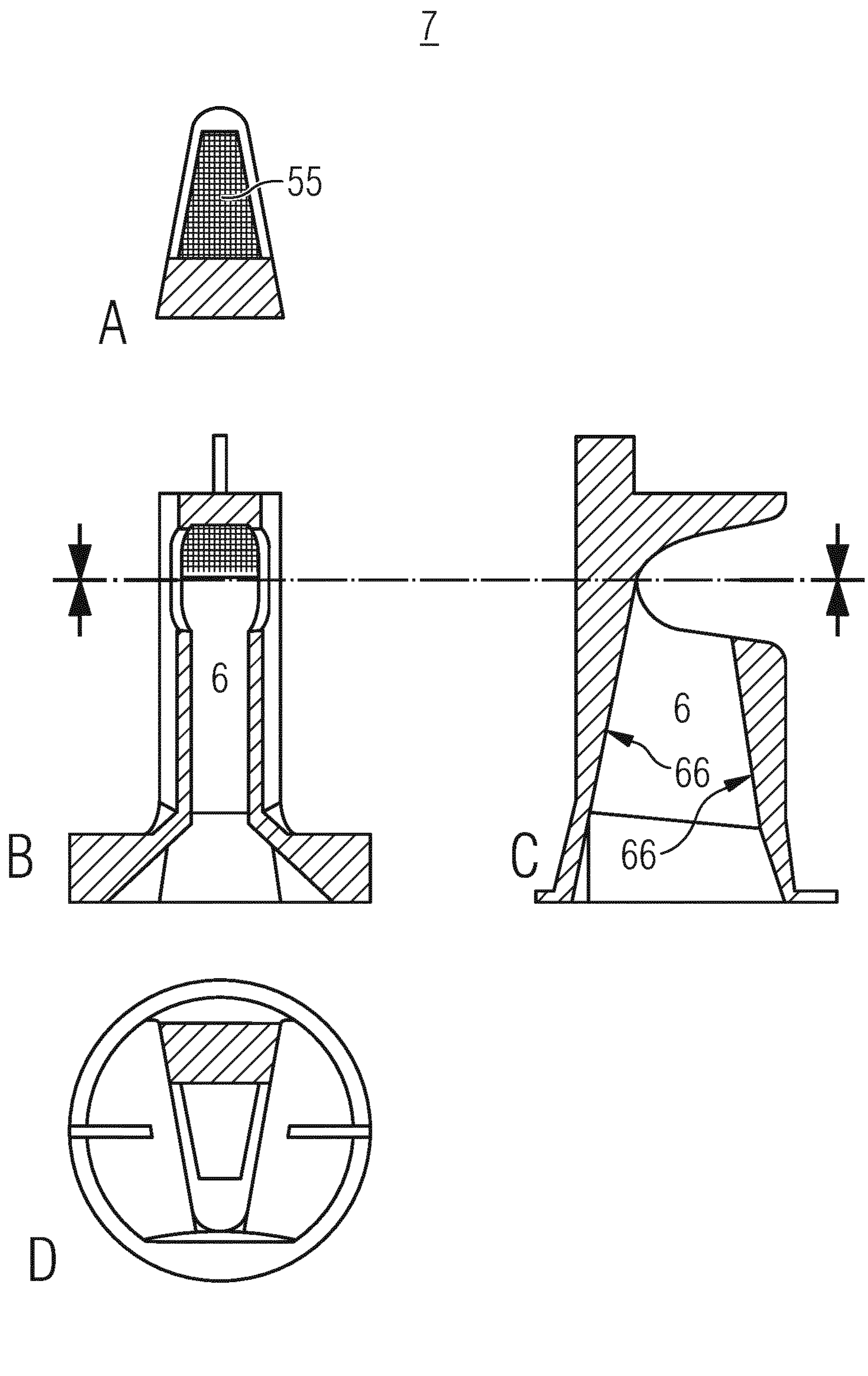
FIG. 8 shows cross-sections (hashed areas) of the container holder 7. Therein, the horizontal line indicates the sectional plane.

FIG. 8A shows a horizontal cross-section through the light-guide 6 at the level of the mouth-shaped receptacle 7 just beneath the tongue-like abutment 66, i.e. the upper part of the sections in FIGS. 8B and 8C. FIG. 8B is a vertical cross-section in a front-view arrangement of the light guide 6, whereas FIG. 8C is a cross-section in a side-view arrangement. Designation mark 66 indicates the inner surface of the light-guide 6. FIG. 8D shows a view on the lower part of the sections in FIGS. 8B and 8C.

The advantage of the proposed embodiments is that the suggested measurement chamber extension 10 can be combined with every commercially available NIR-spectrophotometer 1, once its outer contour is suitably adapted to an outer contour of the measurement chamber 20 of the spectrophotometer 1. Herein "suitably" means such adaptation which preserves the conditions of light-tightness and ensures directing the sample beam into the light-guide 6 inside the box 9 for transmission or transflection measurement of the liquid 2 within the syringe 3' in the sterile package 4.

Particularly, FIG. 9 illustrates an embodiment of an extension 10 which can be combined both with a NIR-spectrophotometer 1 and a RAMAN-spectrophotometer 1. The infusion bag 3 is held at least at one tubular section 3*a* by a receptacle 13 at the container holder 7. An edge of the bag 3 is fitted by a bag orienting member 40 with a corresponding opening 12 in the adapter 11. The adapter 11 is light-tightly connected with the measurement chamber 20 of the corresponding spectrophotometer 1. The measurement light beam (e.g. NIR) or a corresponding LASER beam (Raman spectrophotometry) enters the adapter 11 and arrives at (is directed to) the optical element 5 (here a mirror), which is held by a corresponding fixing member 15 (or stabilizing member 15). Said stabilizing member 15 ensures a direct physical contact of the optical member with the outer wall of the bag 3 (or package 4 of the syringe 3) at the corner 3*b*. The distance of the front face of the optical member with respect to the optical window of the measurement chamber 20 defines—together with the thickness of the at least two layers of polymer material—the length of the measurement light path ("layer thickness") in the liquid 2 which contains the API of interest. The measurement light beam is guided by a light guiding channel 6. The channel walls thereof are made out of a reflective material or coated with such. Suitable materials are, e.g., aluminum, gold, spectralon, to name a few. Advantageously, the mirror, i.e. its three-dimensional shape, fitting contour 41 and the surface structure, i.e. roughness, can be adjusted to the current measurement situation during its manufacturing, e.g. by means of CAD-supported 3D-printing (an additive manufacturing technique which can easily and fast be adapted to a given spectrophotometer and packaging of the sterile solution of the API (e.g. a syringe 3, an infusion pump 3—or cartridge for such, an infusion bag 3).

Figure 10:
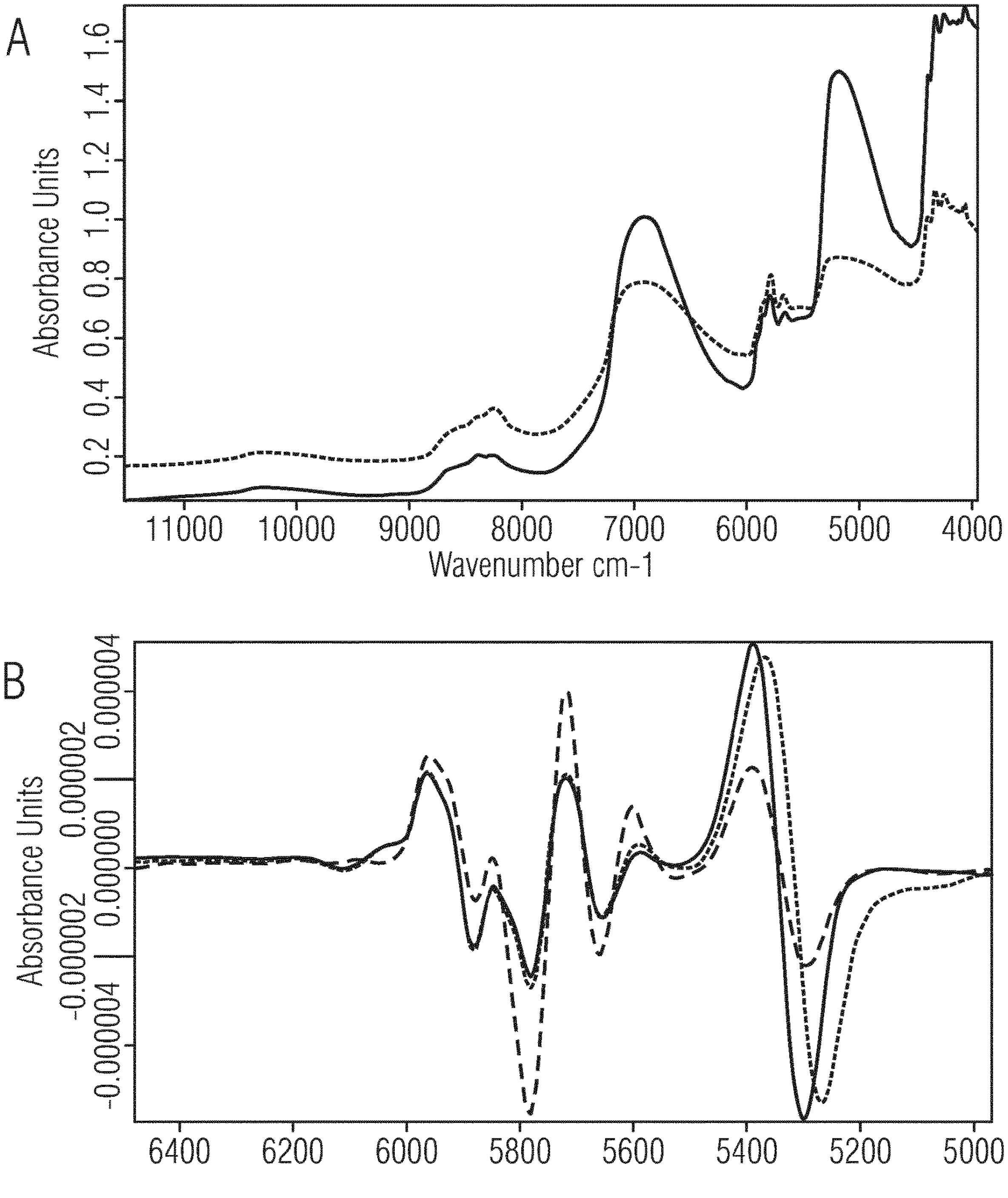
FIG. 10 shows NIR spectra of aqueous API solutions measured directly in infusion bags of the same manufacturer (Fresenius Kabi, Freeflex+), comprising in both cases the same polyolefins.

FIG. 10A relates to a physiological saline, i.e. 0.9% NaCl in water (orange line) compared with a 5% glucose solution "Glucosteril500" in water (green). Glucosteril 500 is a 5% Glucosemonohydrat-solution according to the Ph. Eur.) Both spectra are shown as obtained (original spectral data without any data processing/pretreatment). As evident, the spectral quality achieved with the suggested measurement chamber extension directly from infusion bags is good. By directly comparing the obtained spectra the influence of the omnipresent water band (sec values at ca. 7100, 5250 $cm^{-1}$) is greatly reduced, allowing to acquire content specific signals at other wavenumbers, e. g. between 6000 and ca. 5400 $cm^{-1}$, which is a typical C—H-band region. This and other band regions typical for organic substances comprising hydrogen bonds e. g. C—H and/or N—H are important for identifying typical APIs and hence, can be used. FIG. 10 B shows the corresponding second derivatives of the NIR spectra from FIG. 10 A (NaCl—red and grey lines; Glucosis—blue line). As evident, the very distinctive band at ca. 5800 $cm^{-1}$ (blue spectrum, Glucosis 5% solution) can easily be perceived. That allows the quantification of glucosis, as we can see a very strong API signal.

Figure 11:
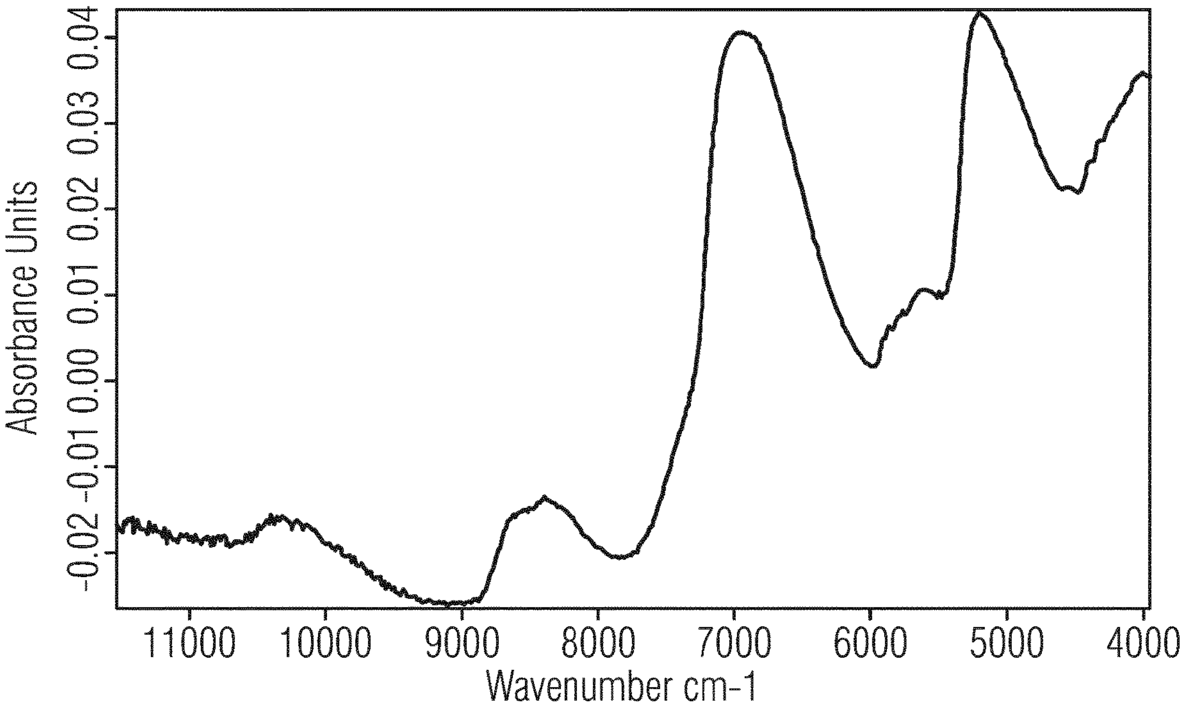
FIG. 11 shows the original NIR-spectrum of Lucentis®, comprising 2.3 mg of the monoclonal antibody Ranibizumab in a disposable plastic syringe, ready to injection.

FIG. 11 shows a spectrum of a ready-to-use syringe of Lucentis 2.3 mg (concentration is 10.0 mg/ml).

The described embodiments have versatile application areas for the detection of pharmaceutical substances, possible contaminants thereof and/or adulterants or their degradation products, e.g. as a result of incorrect storage conditions in the area of pharmaceutical, medical, veterinarian or biochemical application of biologically active substances but also in food, e.g. food additives, concentrates etc., and convenience products. With the aim to demonstrate the feasibility of suggested embodiments, some examples describing the used apparatus and method are given below.

The present invention has been explained with reference to various illustrative embodiments and examples. These embodiments and examples are not intended to restrict the scope of the invention, which is defined by the claims and their equivalents. As is apparent to one skilled in the art, the embodiments described herein can be implemented in various ways without departing from the scope of what is invented. Various features, aspects, and functions described in the embodiments can be combined with other embodiments.

REFERENCE SIGNS

- 1 spectrophotometer (NIR- or Raman-spectrophotometer)
- 2 liquid, e.g. a biologically active substance, a drug, a vaccine, a food additive
- 3 polymer container (infusion bag, pump or disposable plastic syringe, optionally packaged)
- 3*a* tubular section of polymer container
- 3*b* corner of polymer container, esp. of infusion bag
- 4 sterile package (typically made from a polymer foil)
- 5 optical element, e.g. mirror or light guide
- 6 channel, e.g. light guiding channel
- 66 abutment, tongue of holder 13
- 7 container holder
- 8 lid
- 87 lip, channel flange
- 88 opening in light-tight box
- 9 light-tight box
- 90 outer fitting surface of light-tight box comprising opening
- 10 measurement chamber extension
- 11 adapter
- 12 adapter opening
- 13 receptacle, holding member for tubular part
- 15 mirror fixing member
- 20 measurement chamber
- 40 bag orienting member
- 41 outer contour of bag orienting member

The invention claimed is:

1. A measurement chamber extension for a spectrophotometric characterization with a NIR-spectrophotometer or a Raman-spectrophotometer of a liquid in a polymer container comprising a tubular section, wherein the measurement chamber extension comprises:
   - an adapter plate having an adapter opening;
   - a container holder comprising a receptacle; and
   - an optical element comprising a mirror;
   - wherein the adapter plate is light-tightly connectable to the measurement chamber of the NIR-spectrophotometer or of the Raman-spectrophotometer by its outer contour being adapted to an outer contour of the measurement chamber of the spectrophotometer, and the adapter opening is arranged to encompass a measurement window of the NIR-spectrophotometer or Raman-spectrophotometer to provide exposition of the liquid to a measurement light beam emitted from the measurement chamber of the NIR-spectrophotometer or Raman-spectrophotometer through the measurement window;
   - wherein the receptacle of the container holder is configured to arrange the optical element adjacent to a surface of the polymer container containing the liquid providing a loss-free transflection of the measurement light beam from the optical element to a detector of the NIR-spectrophotometer or Raman-spectrophotometer;
   - wherein the receptacle is configured to hold the tubular section of the polymer container as to allow a reproducible layer thickness for the transflection measurement;
   - wherein the container holder comprises an optical element support structure comprising a light guiding channel, wherein a width of the light guiding channel is adapted to fit with a width of the measurement window of the NIR-spectrophotometer or Raman-spectrophotometer;
   - wherein the optical element comprising the mirror comprises a gold layer, and
   - wherein the polymer container is selected from: a syringe, an infusion pump, a cartridge for an infusion pump, and an infusion bag.

2. The measurement chamber extension according to claim 1, wherein the receptacle is formed by the light guiding channel together with the mirror.

3. The measurement chamber extension according to claim 1, wherein a surface of the light guiding channel is covered with a gold layer.

4. The measurement chamber extension according to claim 1, wherein the container holder is encased by a light-tight box which comprises a lid, wherein the lid is adapted to close the light-tight box in a light-tight manner.

5. The measurement chamber extension according to claim 4, wherein the mirror is fixed to the lid.

6. The measurement chamber extension according to claim 3, wherein the gold layer on the surface of the light guiding channel merges with the gold layer of the mirror and the mirror is integrated with the light guiding channel.

7. The measurement chamber extension according to claim 1, wherein the mirror is a diffusive mirror.

8. The measurement chamber extension according to claim 7, wherein the mirror has a corrugated surface formed by an arrangement of multiple mirrors, wherein the gold layer encompasses each of the multiple mirrors comprising a flat polygonal face.

9. The measurement chamber extension according to claim 8, wherein the corrugated surface of the mirror has a roughness in a range of 20 μm-1000 μm.

10. The measurement chamber extension according to claim 1, wherein an end of the light guiding channel is shaped into a tongue which forms a receptacle for fitting and holding a tubular section of the syringe in an orthogonal orientation relative to a central axis of the light guiding channel, wherein a surface of the tongue which is oriented substantially towards the light guiding channel comprises a corrugated surface comprising the mirror, and wherein the circular section of the syringe is arrangeable in the receptacle within a light path of the measurement light beam.

11. The measurement chamber extension according claim 10, wherein the syringe is enclosed by a sterile package.

12. The measurement chamber extension according to claim 1, wherein the adapter opening is adapted to accommodate a corner of an infusion bag,
   - the measurement chamber extension,
   - further comprising a bag orienting member being at least partially insertable into the adapter opening, wherein an outer contour of the bag orienting member is configured to fit over a major part of an outer contour length with an inner contour of the adapter opening, and
   - wherein a pair of corresponding permanent magnets is arranged at or near to fitting edges of the adapter opening and the bag orienting member.

13. The measurement chamber extension according to claim 12, wherein a thickness of a layer of the liquid in the bag is adjustable between 0.2 mm-5.1 mm by a layer fixing member.

14. The measurement chamber extension according to claim 12, wherein the mirror is fixable by a mirror fixing member,
   - wherein the mirror fixing member and the bag orienting member comprise at least one magnet of the pair of corresponding permanent magnets for stabilization of the mirror within the channel, wherein the channel is dimensioned to encompass the mirror.

15. A method of using the measurement chamber extension according to claim 1 for analyzing in combination with a NIR-spectrophotometer or a Raman-spectrophotometer a liquid in a polymer container selected from: an infusion bag, a syringe, an infusion pump, a cartridge for an infusion pump, an infusion bag, and a syringe enclosed in a sterile package, the method comprising:
   - holding the tubular section of the polymer container by a receptacle;
   - arranging the optical element of the measurement chamber extension adjacent to a surface of the polymer container;
   - directing a measurement light beam towards the optical element and analyzing a transflected light with a spectrophotometer, selected from a NIR-spectrophotometer and a Raman-spectrophotometer;
   - comparing a signal generated by the transflected light with a data set stored in a data base comprising NIR-spectra or Raman-spectra of similar or identical samples;
   - determining at least one of: an identity of the liquid, an adulterant of the liquid, and a contaminant of the liquid;
   - wherein the measurement light beam comprises light within a wavenumber range of 4,000 $cm^{-1}$-12,500 $cm^{-1}$, and
   - wherein, in consecutive measurements, measurement light beams of different wavelengths are directed towards the optical element, and/or measurement light beams are directed under different angles towards the optical element.

16. The method according to claim 15, wherein the database comprises datasets belonging to different sample types including typical product ranges of material in the polymer container and/or the sterile package of the syringe.

17. The method according to claim 16, wherein a software of the NIR-spectrophotometer or of the Raman-spectrophotometer or in a control unit thereof is adapted to extract from a measured NIR- or Raman-spectrum the corresponding spectrum belonging to the material comprising the polymer container or the sterile package of the syringe.

* * * * *